United States Patent Office 2,778,241
Patented Jan. 22, 1957

2,778,241

DISCRIMINATOR DEVICE

Arthur W. Gaubatz, Indianapolis, Ind., assignor to General Motors Corporation, Detroit, Mich., a corporation of Delaware Application October 31, 1951, Serial No. 254,142

8 Claims. (Cl. 74—479)

My invention is directed to a device which I call a discriminator. The purpose of the device is to transmit movement from either of two driving devices to a driven device in such manner that the driven device will move with whichever of the driving devices is farthest advanced from a datum position. One field of use of the invention is to provide for normal operation or control of the driven member by one of the driving members but to provide overriding control by the second one of the driving members whenever it is advanced beyond the position of the first driving member. The invention permits either driving member to be advanced freely, independently of the position of the other driving member.

In the preferred embodiment of the invention, it is in the form of a mechanical movement or linkage; however, the principles of the invention may be embodied in various forms and the invention is not restricted to a mechanical movement. The principal objects of the invention are to provide a device by which a driven device may be actuated by either of two driving devices, being coupled to the driving device which is farthest advanced from a datum position, and to provide a device of this character which is simple and reliable.

A more immediate object of the invention lies in the improvement of control systems, such as control systems for aircraft power plants. Since the utility of the invention of this application is not restricted to such a system, the discriminator device is described herein without detailed description of any particular application thereof.

Figure 1:
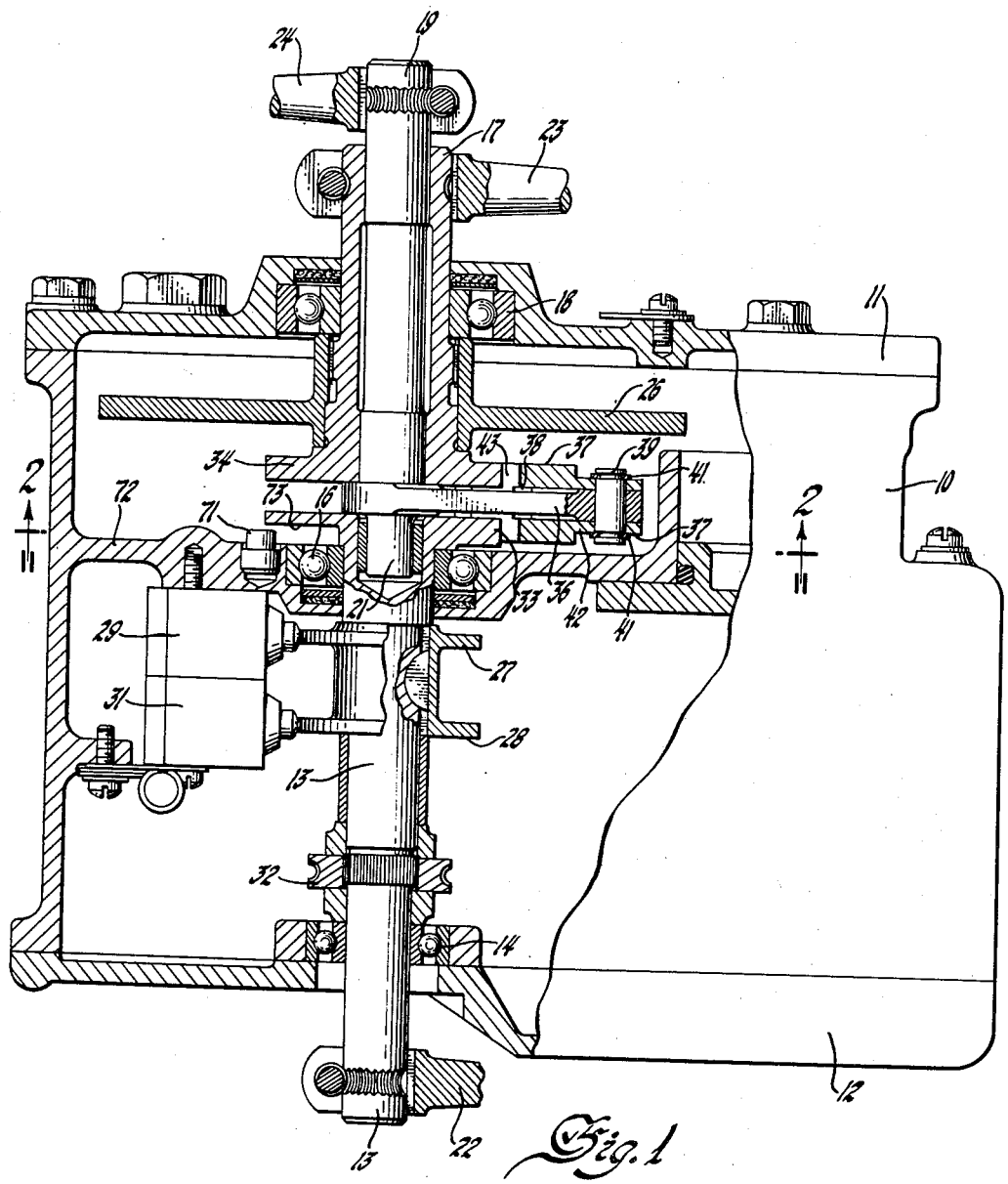
Figure 2:
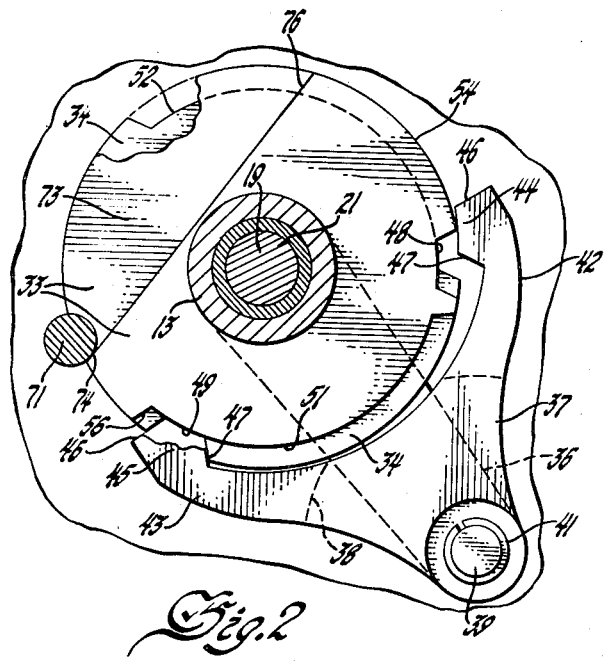
Figure 3:
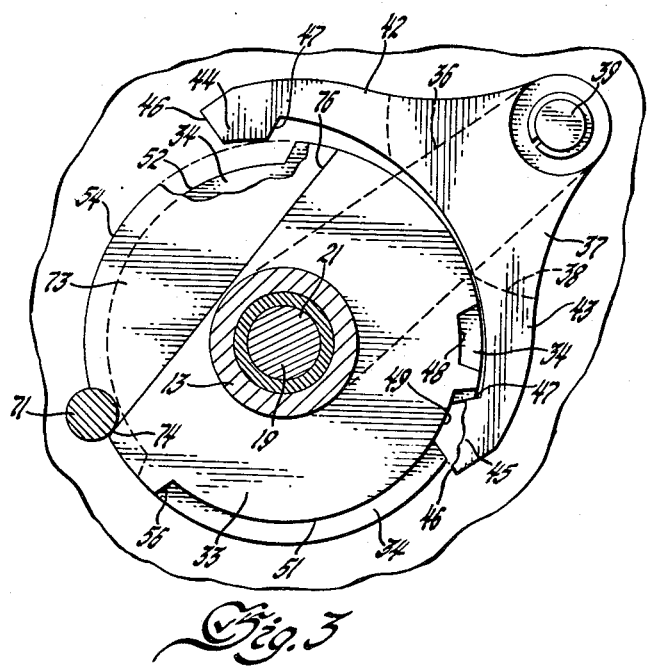
Figure 4:
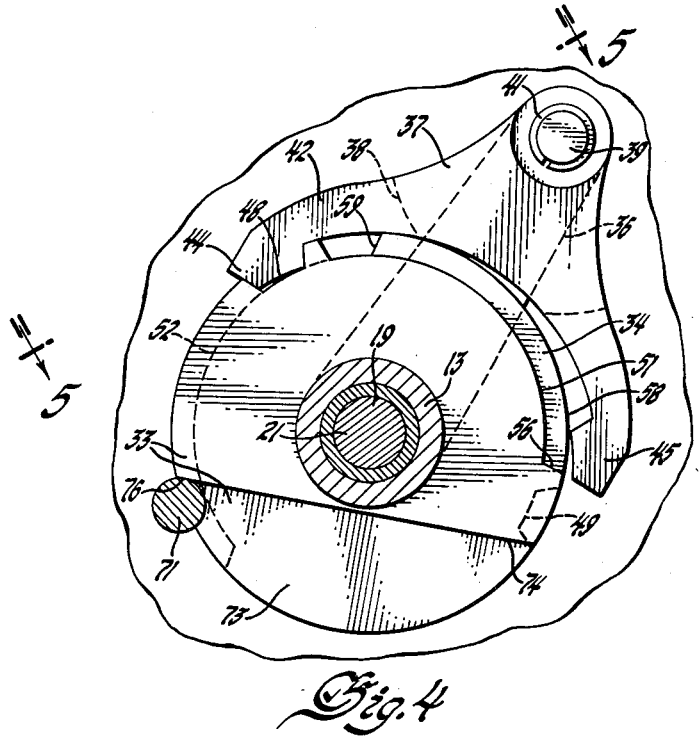
Figure 5:
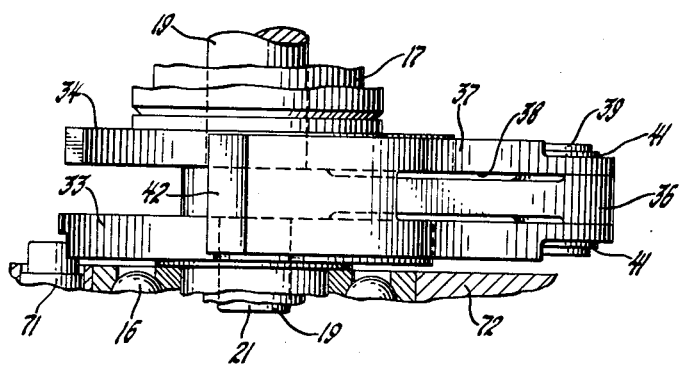

The nature and advantages of the invention and the preferred manner in which the stated objects are realized will be clear from the succeeding detailed description of the preferred embodiment of the invention and the accompanying drawings, in which Figure 1 is a sectional view of a portion of a control device embodying the invention; Figure 2 is a cross-sectional view of the discriminator taken on the plane indicated in Figure 1; Figures 3 and 4 are sectional views taken on the same plane as Figure 2 illustrating different operating relations of the parts, and Figure 5 is a fragmentary view projected on the plane indicated on Figure 4.

Referring first to Figure 1, the control device partially illustrated therein, which may be part of the controls of an aircraft power plant, comprises a case 10 with end covers 11 and 12. A first input or driving shaft 13 is journaled in bearings 14 and 16 fixed in the case. A second input or driving shaft 17, which is coaxial with the shaft 13, is rotatably mounted in a bearing 18 mounted in the cover 11. An output or driven shaft 19, which is coaxial with the shafts 13 and 17, is journaled within the shaft 17 and includes a pilot portion 21 journaled in the inner end of the shaft 13. Motion may be transmitted to and from the shafts 13, 17, and 19 respectively by arms 22, 23, and 24 respectively, which may be connected to any desired actuating and actuated devices. These arms may be adjustably mounted on the shafts in any suitable manner, as, for example, that described in Bendix Patent No. 1,663,290. Each of the shafts 13 and 17 may directly operate driven devices so as to effect any desired functions. In the particular embodiment illustrated, a cam 26 which rotates with the shaft 17 may actuate followers (not shown); cams 27 and 28 mounted on the shaft 13 actuate switches 29 and 31, which may be of a conventional type and be supported in the casing in a conventional manner. A gear or wheel 32 splined to the shaft 13 may transmit mechanical movement. The devices 26, 27, 28, and 32 are merely illustrative of the fact that the two input shafts may effect functions of various sorts, the details of which are immaterial to this invention.

A disk or cam 33 (Figs. 1 to 5) is integral with the inner end of shaft 13 and a disk or cam 34 is integral with the inner end of shaft 17. These disks are the driving members of the discriminator of the invention by means of which motion is transmitted from the shafts 13 and 17 to the driven shaft 19. An arm 36 is fixed on the inner end of the driven shaft 19 between the disks 33 and 34. A coupling member 37, which acts to couple the arm 36 to one or the other of the disks 33 and 34, is slotted out as indicated at 38 so as to embrace the arm 36 and is pivoted on the arm by means of a pin 39 retained by snap rings 41. The coupling member 37 comprises two similar arms 42 and 43 which extend across the rims of the two disks 33 and 34.

As will be clear from Figures 2 to 4, the peripheries of the disks 33 and 34 consist of portions of two different radii. The larger radius of both disks is the same, and likewise, the radius of the cutaway portions of both disks are the same. The coupling member 37 may rock to a limited extent on the pivot 39. One or the other of the arms 42 and 43 is always in engagement with a portion of greater radius of one of the disks, the other arm being thus forced inwardly to engage a surface of smaller radius. By this rocking motion, the coupling member is engaged for positive transmission of motion in either direction from one or the other of the disks 33 and 34 to the arm 36.

Each of the arms 42 and 43 terminates in a dog or latch, 44 and 45 respectively, the external and internal faces 46 and 47 of which are inclined to a plane containing the axis of the shafts and passing through the dogs so that the coupling member 37 can be cammed around its pivot 39 by rotation of the disks 33 and 34. Disks 33 and 34 will be referred to hereinafter as "front" and "rear" disks as they appear in Figs. 2 to 4, for greater clarity. The portions 44 and 45 act both as dogs and as cam followers, as will be seen. The front disk 33 is provided with a driving notch 48 formed to receive the dog 44 on the arm 42. The rear disk 34 is formed with a similar driving notch 49 adapted to receive the dog 45 on the arm 43. The shoulders which terminate the notches 48 and 49 effect driving engagement with the faces 46 and 47 of the arms of the coupling member.

Closely adjacent the notch 48 on the front disk 33 is an extended portion 51 of small radius within which the dog 45 can travel over the disk 33. An extended portion of 52 of small radius within which the dog 44 can slide is provided on the rear disk 34.

In Figure 2, the front disk 33 is shown in its initial or datum position from which it is moved counterclockwise by rotation of the shaft 13. The rear disk 34 is very slightly advanced from its datum position, and with it the coupling member 37, arm 36 and shaft 19. It should be understood that the disk 34 may not be capable of rotating clockwise from the position of Figure 2. Its datum position, however, corresponds to that of the disk 33, as will be further explained. In Figure 3, the front disk 33 remains in the datum position but the rear disk 34 has been rotated approximately 90° counterclockwise, carrying the arm 36 with it. In Figure 4, the rear disk 34 remains in the same position as in Figure 3, but the front disk 33 has been fully advanced, carrying the arm 36 and shaft 19 still farther counterclockwise. It will be understood, of course, that regardless of the position of either of the disks 33 and 34 rotation of the other disk to a greater extent from the datum position will carry the arm 36 ahead with whichever disk is farthest advanced.

Considering now the operation of the device, in Figure 2 the dog 45 of the coupling member is engaged in the notch 49 of rear disk 34, and dog 44 is riding on the portion 54 of full radius of the front disk 33. The engagement of the dog 44 with the surface 54 holds the dog 45 in the notch 49. If the shaft 17 is rotated farther counterclockwise, toward the position of Figure 3, the dog 45 remains engaged in notch 49 and slides over the portion 51 of the front disk 33, the dog 44 sliding over the surface 54 of the disk 33. The maximum movement of the shafts 17 and 19 with the shaft 13 in its datum position is limited by the arcuate extent of the portion 51 of disk 33.

If the shaft 17 is returned toward its datum position, as clockwise in Figures 2 and 3, the dog 45 remains engaged in the rear disk 34 and the shaft 19 follows this movement.

Now, if we assume the rear disk 34 remaining in the position illustrated in Figure 3 and the front disk 33 being rotated from its datum position up to the angular extent of movement attained by the disk 34, the disk 33 at first turns freely without any effect upon the coupling member 37. The surface 51 of the disk 33 slides under the dog 45 and the surface 54 slides under the dog 44. However, when the cam surface 56 of the front disk 33 reaches the surface 46 of the coupling member, it acts to cam the dog 45 out of engagement with the notch 49. At the same time, the notch 48 in the front disk 33 comes under the dog 44. When the dog 45 is engaged in the notch 49, the dog 44 is disposed above the surface 52 of the rear cam 34. Thus, as the surface 46 of the dog 45 moves outwardly, the dog 44 is free to move inwardly into the notch 48. The dog 44 thus engages the notch 48 of the front cam 33 and the dog 45 is removed from engagement with the notch 49 in the rear disk 34. Further movement of the disk 33 thus carries the coupling member 37 with it, rotating the shaft 19 beyond the position to which it was moved by the shaft 17. The dog 45 moves over a portion 58 of full radius of the rear disk 34, which holds the coupling member in engagement with the notch 48 of the front disk 33.

If the front disk 33 is returned toward the position of Figure 3 from the position of Figure 4, the dog 44 is cammed outwardly by the surface 59 at the end of the portion 52 of the rear disk 34 and, thus, the dog 45 is dropped back into engagement with the notch 49 of rear disk 34.

It will thus be seen that the coupling member 37 engages with either disk for positive transmission of motion and automatically engages the disk which is rotated farthest counterclockwise from the datum position, being cammed into such engagement by that disk and out of the other disk and being held in such engagement by the other disk during further counterclockwise rotation. In the clockwise return rotation of the coupled disk the coupling member 37 is cammed out of the rotating disk by the other disk and held in engagement with the other disk by the clockwise rotating disk.

Thus, in the apparatus illustrated in Figure 1, the output shaft 19 may normally be controlled by the input shaft 17, following accurately and positively the movements of that shaft. During such movement, the shaft 13 may remain stationary. However, regardless of the position of the shaft 17, the shaft 13 may be rotated to a greater extent than the shaft 17, and, upon so doing, will be positively coupled with the shaft 19 to drive the same. This action will not affect the position of the input shaft 17, which may remain in its previous position.

A means for limiting the range of angular travel of the disk 33 and shaft 13 comprises a pin 71 pressed into a hole in the web 72 of the casing and extending adjacent the disk 33. One face of the disk is milled away at 73 to provide abutments 74 and 76 which engage the pin 71 at the limits of travel of the disk 33.

The datum positions of the disks, to which reference has been made, may be arbitrary. The datum position of disk 33 may be taken as that at which the abutment 74 strikes the pin 71. The datum position of disk 34 is then in such a position that both disks are equally advanced from their datum positions when the shift of drive from one disk to the other occurs. It will be understood, of course, that this shift requires a finite degree of relative movement of the disks in the illustrated embodiment. This relative movement is not material. It should also be understood that the disks need not actually be capable of returning to the arbitrary datum positions.

It will be noted that the members 33, and 34, and 37 rotate in parallel paths. They might reciprocate in parallel linear paths, or otherwise move in parallel paths, and function in the same manner.

It will be apparent that the principle illustrated by the preferred embodiment of the invention may be embodied in structures of many types by the exercise of skill in the art. The invention, therefore, is not to be considered as limited or restricted by the detailed description of the preferred embodiment for the purpose of illustrating the principles thereof.

I claim:

1. A mechanical movement comprising two disks mounted for rotation about a common axis concentric with the disks, a driven member rotatable about the same axis, a coupling member for coupling the driven member to either of the disks, the coupling member being pivoted on the driven member on an axis parallel to the first said axis and outside the perimeter of the disks, the coupling member comprising two arms extending to the peripheries of the disks at circumferentially spaced points, mutually engaging means on the first arm and the first disk, mutually engaging means on the second arm and the second disk, the mutually engaging means coupling the coupling member to the disks, a cam on the periphery of each disk, and cam followers on the arms adapted to engage the said cams to pivot the coupling member to engage the arms with the disks selectively in response to the relative degree of rotation of the disks.

2. A mechanical movement comprising, in combination, a first rotatable driving member including a first disk, a second rotatable driving member including a second disk, a rotatable driven member, all the said member being mounted for rotation about a common axis, a coupling member mounted on the driven member for rotation relatively thereto about an axis parallel to the first-mentioned axis, the coupling member including first and second arms extending adjacent the perimeter of the disks at circumferentially spaced points, means on the first disk positively engageable with the first arm, means on the second disk positively engageable with the second arm, the said engagement providing positive transmission of movement in both directions, a cam follower on each said arm, and a cam surface formed on the perimeter of each disk, the cam surface of the first disk engaging the follower on the second arm and the cam surface of the second disk engaging the follower on the first arm, the cam surfaces being so constructed and arranged that the cam surface of each disk rotates the coupling member to bring an arm thereof into engagement with the engageable means of the said disk.

3. A mechanical movement comprising, in combination, a first movable driving member, a second movable driving member, stationary means movably supporting the driving members, a movable driven member, coupling means movably mounted on the driven member shiftable between two positions including means coupled alternatively with the driving members in the respective positions thereof, and cam means on each of the driving members engageable with the coupling means upon relative movement of the driving member and the driven member and operable upon engagement with the coupling means to shift the coupling means to couple the driven member to one driving member and decouple the driven member from the other driving member.

4. A mechanical movement comprising, in combination, a first movable driving member, a second movable driving member, stationary means movably supporting the driving members, a movable driven member, coupling means movably mounted on the driven member shiftable between two positions including means coupled alternatively with the driving members in the respective positions thereof, and cam means on each of the driving members engageable with the coupling means upon relative movement of the driving member and the driven member and operable upon engagement with the coupling means to shift the coupling means to couple the driven member to that driving member and decouple the driven member from the other driving member.

5. A mechanical movement comprising, in combination, two driving members, a driven member, means supporting the driving and driven members for parallel movement, a coupling member for coupling the driven member to either of the driving members, the coupling member being pivoted on the driven member, the coupling member comprising first and second arms overlying the surfaces of the driving members, mutually engaging means on the first arm and the first driving member, mutually engaging means on the second arm and the second driving member, the mutually engaging means being adapted to couple the coupling member to the driving members, a cam on each driving member, and cam followers on the arms adapted to engage the said cams to pivot the coupling member to couple the arms to the driving members selectively in response to the relative degree of movement of the driving members, the cam on each driving member pivoting the coupling member to engage the coupling member with the said driving member and disengage the coupling member from the other driving member.

6. A mechanical movement comprising, in combination, two driving members, a driven member, means supporting the driving and driven members for parallel movement, a coupling member mounted on the driven member for rotation relatively thereto about an axis thereon, the coupling member including first and second arms extending adjacent the surfaces of the driving members, means on the first driving member positively engageable with the first arm, means on the second driving member positively engageable with the second arm, said engagement providing positive transmission of movement in both directions of movement, a cam follower on each said arm, and a cam surface defined by each driving member, the cam surface of the first driving member engaging the fol-  lower on the second arm and the cam surface of the second driving member engaging the follower on the first arm, the cam surfaces being so constructed and arranged that the cam surface of each driving member rotates the coupling member about its axis of rotation to bring an arm thereof into engagement with the engageable means of the said driving member and to bring an arm thereof out of engagement with the engageable means of the other driving member.

7. A mechanical movement comprising, in combination, two driving members, a driven member, means supporting the driving and driven members for parallel movement, a coupling member for coupling the driven member to either of the driving members, the coupling member being pivoted on the driven member on an axis transverse to the direction of movement of the members, the coupling member comprising first and second arms overlying the surfaces of the driving members at points spaced in the direction of movement of the members, mutually engaging means on the first arm and the first driving member, mutually engaging means on the second arm and the second driving member, the mutually engaging means being adapted to couple the coupling member to the driving members, a cam on each driving member, and cam followers on the arms adapted to engage the said cams to pivot the coupling member to couple the arms to the driving members selectively in response to the relative degree of movement of the driving members.

8. A mechanical movement comprising, in combination, two driving members, a driven member, means supporting the driving and driven members for parallel movement, a coupling member mounted on the driven member for rotation relatively thereto about an axis transverse to the direction of movement of the members, the coupling member including first and second arms extending adjacent the surfaces of the driving members at points spaced in the direction of movement of the members, means on the first driving member positively engageable with the first arm, means on the second driving member positively engageable with the second arm, said engagement providing positive transmission of movement in both directions of movement, a cam follower on each said arm, and a cam surface defined by each driving member, the cam surface of the first driving member engaging the follower on the second arm and the cam surface of the second driving member engaging the follower on the first arm, the cam surfaces being so constructed and arranged that the cam surface of each driving member rotates the coupling member about its axis of rotation to bring an arm thereof into engagement with the engageable means of the said driving member.

References Cited in the file of this patent

UNITED STATES PATENTS

| | | |
|---|---|---|
| 822,057 | Krebs | May 29, 1906 |
| 1,663,290 | Bendix | Mar. 20, 1928 |
| 2,588,855 | Lapsley | Mar. 11, 1952 |
| 2,660,650 | Goetz | Nov. 24, 1953 |

FOREIGN PATENTS

| | | |
|---|---|---|
| 230,482 | Great Britain | May 14, 1925 |
| 436,652 | Great Britain | Oct. 16, 1935 |
| 594,639 | France | June 27, 1925 |
| 902,307 | France | Nov. 27, 1944 |